E. KAYLOR.
Nut-Locks.

No. 145,427.

Patented Dec. 9, 1873.

WITNESSES
R. E. Henderson.
J. K. Fitler

INVENTOR
Edward Kaylor
by Bakewell Christy & Kerr
his attys

UNITED STATES PATENT OFFICE.

EDWARD KAYLOR, OF PITTSBURG, PENNSYLVANIA.

IMPROVEMENT IN NUT-LOCKS.

Specification forming part of Letters Patent No. 145,427, dated December 9, 1873; application filed May 13, 1873.

*To all whom it may concern:*

Be it known that I, EDWARD KAYLOR, of Pittsburg, in the county of Allegheny and State of Pennsylvania, have invented a new and useful Improvement in Nut-Locking Device; and I do hereby declare the following to be a full, clear, and exact description thereof, reference being had to the accompanying drawing forming a part of this specification, in which—

Figure 1:
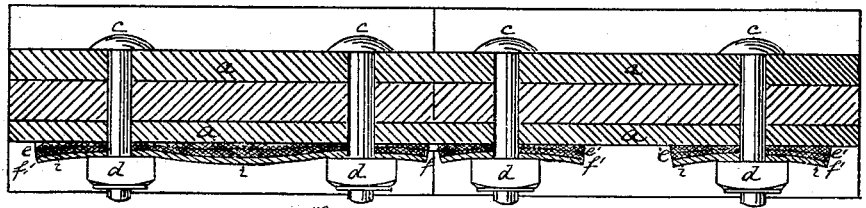
Figure 2:
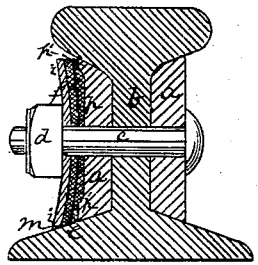
Figure 3:
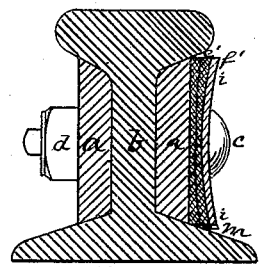

Figure 1 is a horizontal section of a railroad-rail and fish-bars at the point cut by the bolts. Fig. 2 is a vertical section of the same; and Fig. 3 is a like view, the position of the washers being changed.

Like letters of reference indicate like parts in each.

My invention consists in interposing a strip or washer of india-rubber between a thin flat metallic plate or washer inserted under the nut of a railroad-rail bolt and the outer face of the fish-bar, the result of such an arrangement being that, when the nut is screwed down, the rubber washer is squeezed out from the point where the greatest pressure is—namely, directly under the nut—and bends up the outer edges of the metallic plate around the edges of the nut, and prevents its turning.

To enable others skilled in the art to make and use my improvement, I will describe it more fully.

In applying my invention I make use of ordinary fish-bars *a a* for jointing the rails *b b*, and of bolts and nuts *c* and *d*, such as are ordinarily used for that purpose. After the bolts are put in place I place upon them, against the face of the fish-bar, a piece of rubber, *e;* and upon this piece of rubber I place a thin flat metallic plate or strip, *f*, and then screw the nuts *d* onto the bolts. The rubber I make use of for this purpose has a cloth lining to reduce its elasticity, since ordinary rubber would spread too much under the pressure of the nut. When the nut is screwed down the india-rubber washer *e* presses out from under it, and swells up beyond the edges of the nut, bending up the thin plate around the edges of the nut, as shown at *i* in the drawing. The effect of this swelling of the plate around the edges of the nut is to lock the nut firmly in position, so that it cannot turn.

If it is preferred, square washers of rubber and metal—such as are shown at *e' f'*—may be used instead of the strips *e* and *f;* but in this case, to prevent the turning of such washers, the lower edge must rest against the flange of the rail, as shown at *m*.

If desired, the outer face of the fish-bar may be made slightly grooved, as shown at *p*, and with inclined edges *p'*, so that when the rubber washer *e* is placed in position it will not spread up and down.

The rubber washer *e*, bearing against the broad surface of the washer or plate *f*, around which it cannot spread, takes up all the slack of the bolt *c*, and makes a tight joint.

What I claim as my invention, and desire to secure by Letters Patent, is—

The nut-locking device, consisting of the thin flat metallic plate, and the broad elastic washer, the latter, when displaced by the pressure of the nut, bending the former up around the edges of the nut, to prevent its turning, substantially as described.

In testimony whereof I, the said EDWARD KAYLOR, have hereunto set my hand.

EDWARD KAYLOR.

Witnesses:
T. B. KERR,
A. PHILLIPS.